C. L. BOPP.
ELECTRIC TIME RELEASE AIR VALVE.
APPLICATION FILED FEB. 10, 1913.
1,085,012.
Patented Jan. 20, 1914.
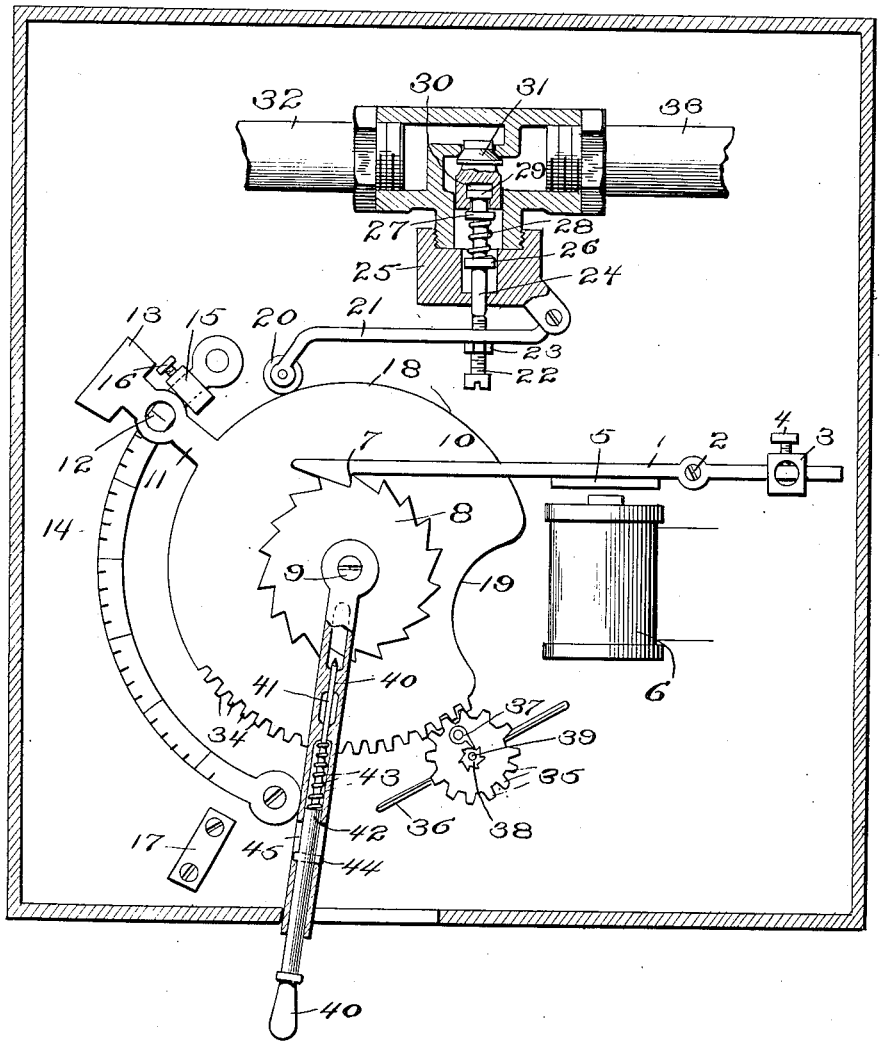
Witnesses
R. S. Trogner
W. H. Wakefield
Inventor
Clinton L. Bopp,
By Mason Fenwick & Lawrence
Attorneys

UNITED STATES PATENT OFFICE.

CLINTON L. BOPP, OF WATERLOO, IOWA.

ELECTRIC TIME-RELEASE AIR-VALVE.

1,085,012. Specification of Letters Patent. Patented Jan. 20, 1914.

Application filed February 10, 1913. Serial No. 747,447.

*To all whom it may concern:*

Be it known that I, CLINTON L. BOPP, a citizen of the United States, residing at Waterloo, in the county of Blackhawk and State of Iowa, have invented certain new and useful Improvements in Electric Time-Release Air-Valves; and I do hereby declare the following to be a full, clear, and exact description of the invention, such as will enable others skilled in the art to which it appertains to make and use the same.

This invention relates to automatic time-release mechanisms as associated with cap signals, and an object of the invention is to provide an improved device for opening valves, the device being provided with means for estimating the time required for setting the valve.

A further object of the invention is to provide improved means for resetting the time mechanism after the same has been actuated to open the valve.

With these and other objects in view, the invention consists in certain novel constructions, combinations and arrangements of the parts as will be hereinafter fully described, and then specifically pointed out in the claims.

The drawing represents a vertical section taken through a casing containing the various devices comprising this invention.

The invention comprises generally a cam wheel provided with an eye piece which works over the graduated scale, the surface of the wheel engaging a roller operatively connected to an air valve. A fan governor is provided for preventing the too rapid rotation of the cam wheel, and a spring-actuated handle is provided for engaging a pawl rigid with the cam wheel for returning the same after the valve has been opened.

This invention discloses generally, the same type of time release valve as is shown in connection with my induction automatic stop and cab signal system, application for which was made July 26, 1912, and which bears Serial No. 711,746.

Referring to the drawing, it will be seen that a lever 1 pivoted in the casing as at 2, has adjustably mounted upon one end thereof a weight 3, which weight may be held securely to the lever in any desired position by means of a suitable set screw 4. The other end of the lever 1 carries an armature 5, which is adapted to be attracted by an electrical magnet 6 which is normally energized by means of signal circuits not disclosed herein, but shown in the aforesaid application. A ratchet tooth 7 is carried by the lever 1, and engages the ratchet wheel 8 which is rotatably mounted upon a shaft 9.

Mounted upon the shaft 9 rigidly with the ratchet wheel 8, is a cam wheel 10, which has extending therefrom an ear 11 provided with an opening 12, this ear 11 also being provided at the outer extremity thereof with a suitable weight 13. Secured within the casing in which the shaft 9 is mounted, is an arcuate graduated scale 14, this scale being located beneath the ear 11 so that the graduations will appear through the opening 12. There is mounted upon the scale 14, an adjustable stop member 15 set at any position on the scale by a suitable set screw 16. Adjacent the lower end of the scale 14, is a stop 17 stationary with respect to the scale 14, and adapted to limit the downward movement of the weight 13. The part 18 of the periphery of the cam wheel 10, is concentric with the shaft 9, and terminates in a recessed portion 19 formed in the cam wheel 10. A roller 20 carried by a pivoted arm 21, is adapted to engage the periphery of the wheel 10, so that as the part 18 moves from under the wheel 20, the said wheel will drop into the recess 19.

Carried by the arm 21, is a screw 22 located in any desired position by means of a suitable lock nut 23, the screw 22 being adapted to engage the lower end of a valve rod 24, which is slidably mounted within a casing 25. The valve rod 24 carries a collar 26 rigid therewith, and a collar 27 slidable thereon, a spring 28 being mounted upon the valve rod between the two collars. The upper end of the valve rod 24, is provided with a shoulder 29, which is received by a recess 30, formed within a valve 31, which valve 31 is designed when closed, to prevent the passage of air from the air pipe 32 to the air pipe 33. The object of the spring 28 and movable collar 27, is to take up the jar of the valve incident to the setting thereof.

Part of the periphery of the cam wheel 10, is provided with teeth 34 which are designed to engage the pinion 35 suitably mounted within the casing, and having rigid therewith the fan 36. Pivotally mounted upon the pinion 35, is a pawl 37 adapted to engage a small ratchet wheel 38 mounted upon a shaft 39, this shaft 39 also serving to support the pinion 35. The pawl 37 and the ratchet wheel 38 are so arranged that the fan 36 will be set into operation when the cam wheel 10 rotates under the action of the weight 13.

In the operation of the device thus far described, it will be noted that just as soon as the electric magnet 6 becomes deënergized, the ratchet teeth 7 will be raised from the ratchet wheel 8, insomuch as the weight 3 is made of sufficient size to overbalance the toothed end of the lever 1. When the tooth 7 is raised from the ratchet wheel 8, the cam wheel 10 will be free to rotate, and the weight 13 will cause a rotation which will result in the passing of the opening 12 over the scale 14. An attendant will be able to estimate by means of the position of the opening 12 with respect to the scale 14, and also by means of the velocity of the plate, how long it will take the portion 18 to move from under the roller 20 and engage in the recess 19. As soon as the roller 20 has reached the recess 19, the air pressure from the pipe 32, will force the valve 31 downwardly to keep the roller in contact with the surface of the recess 19. As soon as the roller enters the recess, the compressed air will force the valve 31 downwardly and thereby permit the passage of air to the pipe 33 so that the brakes of a train may be set. It will be noted that during this operation, the pawl 37 engages one of the teeth of the small ratchet wheel 38 for turning the fan 36.

For the purpose of returning the valve 31 to its normally closed position, there is provided a hollow handle or lever 40 which is loosely mounted upon the shaft 9. Slidably mounted within the handle, is a rod 41 having formed therewith a shoulder 42 which is adapted to engage a spring 43 mounted within a pocket formed in the handle 40. A pin 44 passes through the rod 41, and suitable slots 45 in the handle, to limit the downward movement of the rod. When it is desired to turn the wheel, the rod 41 is pushed inwardly against the spring 43, and the lever 40 moved in such a direction as to return the weight 13 to its normal position. If the electric magnet 6 be energized by this time, then the ratchet tooth 7 will engage the teeth of the wheel 8 to hold the weight 13 in any intermediate position. It will be seen that when the weight is being returned, the fan is not operated, but that if the electric magnet 6 be still deënergized, then the fan will prevent the descent of the weight 13 during the time required to move the lever back until the rod 41 can engage another tooth of the ratchet 8.

In the application heretofore mentioned, it is desirable to have it within the power of the attendant to prevent the setting of brakes before the roller 20 reaches the recess 19 if he so desires, and further, the magnet 6 may or may not be energized at the time the attendant desires to prevent the setting of the valve, so that it is desirable to have a fan or other means which will not only retard the descent of the weight 13 when the roller is in the recess 19, but will also prevent the descent of said weight when the lever 40 is being used for returning the mechanism to normal position.

It will be seen that insomuch as the toothed section of the cam is upon one side of the recess 19, and the cam face 18 upon the other side, the weight 13 is opposite the recess 19, so that the turning movement of the weight is increased, insomuch as that part of the wheel opposite the weight is of less weight than the rest of the wheel.

What I claim is:

1. In an automatic time release mechanism, a rotatably mounted cam disk and ratchet wheel moving therewith, part of the cam being provided with teeth, a pinion mounted to engage said teeth, means moving with the pinion for retarding the motion of the cam, and means engaging the ratchet wheel adapted to give intermittent impulses thereto for resetting the cam disk.

2. In an automatic time release mechanism, a rotatably mounted cam disk provided with teeth, a pinion rotatably mounted adapted to engage said teeth, retarding means moving with said pinion and means for giving intermittent impulses to the cam disk to reset the same.

3. In an automatic time release mechanism, a rotatably mounted cam disk, a weight extending therefrom adapted to rotate said disk, teeth formed on the cam disk, a pinion engaging said teeth, means moving with said teeth for retarding the motion of the cam disk, and means for giving intermittent impulses to the cam disk for resetting the same.

4. In an automatic time release mechanism, a rotatably mounted cam disk, means for moving said disk under the force of gravity, teeth formed on said cam disk, a pinion adapted to engage said teeth, means for retarding the motion of the cam disk, means associated with the pinion adapted to move said retarding means when the pinion moves in a predetermined direction, and means for giving intermittent impulses to the cam disk for resetting the same.

In testimony whereof I affix my signature in presence of two witnesses.

CLINTON L. BOPP.

Witnesses:
H. H. SORG,
F. W. EKLUND.